United States Patent
Raitto et al.

(10) Patent No.: US 9,639,562 B2
(45) Date of Patent: May 2, 2017

(54) AUTOMATICALLY DETERMINING AN OPTIMAL DATABASE SUBSECTION

(71) Applicant: Oracle International Corporation, Redwood Shores, CA (US)

(72) Inventors: John Raitto, Hollis, NH (US); Tirthankar Lahiri, Palo Alto, CA (US); Marie-Anne Neimat, Atherton, CA (US); Chih-Ping Wang, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 165 days.

(21) Appl. No.: 13/842,843

(22) Filed: Mar. 15, 2013

(65) Prior Publication Data
US 2014/0280373 A1    Sep. 18, 2014

(51) Int. Cl.
*G06F 17/30* (2006.01)

(52) U.S. Cl.
CPC .. *G06F 17/30292* (2013.01); *G06F 17/30463* (2013.01); *G06F 17/30442* (2013.01)

(58) Field of Classification Search
CPC ......... G06F 17/30292; G06F 17/30463; G06F 17/30442
USPC ....... 707/737, 802, 803, 804, 806, 807, 808, 707/809, 713, 718, 682
See application file for complete search history.

(56) References Cited

U.S. PATENT DOCUMENTS

| | | | | | |
|---|---|---|---|---|---|
| 5,485,610 | A | * | 1/1996 | Gioielli | ............ G06F 17/30336 |
| 5,819,255 | A | * | 10/1998 | Celis et al. | |
| 6,021,405 | A | * | 2/2000 | Celis et al. | |
| 6,101,502 | A | * | 8/2000 | Heubner | ........... G06F 17/30595 |
| 6,873,982 | B1 | * | 3/2005 | Bates et al. | ................... 707/737 |
| 6,985,912 | B2 | * | 1/2006 | Mullins | ............... G06F 12/0815 |
| 7,007,035 | B2 | * | 2/2006 | Kamath et al. | |
| 7,043,731 | B2 | * | 5/2006 | Ramaswamy | .......... G06F 9/547 709/201 |
| 7,353,231 | B1 | * | 4/2008 | Eslambolchi | ..... G06F 17/30241 707/602 |
| 7,406,477 | B2 | * | 7/2008 | Farrar et al. | |
| 7,539,701 | B2 | * | 5/2009 | Sethi | ..................... G06F 17/303 |

(Continued)

Primary Examiner — Frantz Coby
(74) Attorney, Agent, or Firm — Hickman Palermo Becker Bingham LLP; Albert J. Lee (57) ABSTRACT

A method, apparatus, and system for automatically determining an optimal database subsection is provided. A database subsection is selected to optimize certain benefits when the database subsection is translated, transferred, and cached on an alternative database system, which may utilize a different technology or database engine that provides certain performance benefits compared to the original database system. Algorithms such as multi-path greedy selection and/or dynamic programming may provide optimal or near-optimal results. A host for the alternative database server may be shared with or otherwise located in close physical proximity to improve latency for a database application or client layer. Once the database subsection analysis is completed, a report may be generated and presented to the user, and an implementation script may also be created to automatically configure a client host to function as a cache or replacement system according various cache size configurations described in the report.

39 Claims, 5 Drawing Sheets

(56) References Cited

U.S. PATENT DOCUMENTS

| | | | |
|---|---|---|---|
| 7,802,230 B1* | 9/2010 | Mendicino | G06F 9/541 717/105 |
| 8,032,522 B2* | 10/2011 | Goldstein et al. | 707/718 |
| 8,161,001 B2* | 4/2012 | Di Carlo | G06F 17/30306 707/602 |
| 8,335,794 B1* | 12/2012 | Goodson et al. | 707/759 |
| 8,527,473 B1* | 9/2013 | Brown et al. | 707/682 |
| 8,819,068 B1* | 8/2014 | Knote | G06F 17/30339 707/790 |
| 8,843,487 B2* | 9/2014 | McGraw et al. | 707/736 |
| 8,886,596 B2* | 11/2014 | Effern | G06F 17/30297 707/610 |
| 8,892,569 B2* | 11/2014 | Bowman et al. | 707/743 |
| 2003/0126114 A1* | 7/2003 | Tedesco | 707/3 |
| 2004/0006549 A1* | 1/2004 | Mullins | G06F 17/3056 |
| 2005/0021487 A1* | 1/2005 | Verma | G06F 17/30067 |
| 2006/0242563 A1* | 10/2006 | Liu | G06F 17/227 715/234 |
| 2007/0061289 A1* | 3/2007 | Brown | G06F 11/3447 |
| 2007/0208753 A1* | 9/2007 | Mitchell et al. | 707/10 |
| 2009/0076988 A1* | 3/2009 | Stanelle | 706/12 |
| 2010/0198808 A1* | 8/2010 | Graefe et al. | 707/713 |
| 2010/0198809 A1* | 8/2010 | Graefe et al. | 707/713 |
| 2010/0198810 A1* | 8/2010 | Graefe et al. | 707/718 |
| 2010/0198811 A1* | 8/2010 | Wiener et al. | 707/718 |
| 2012/0166492 A1* | 6/2012 | Bikkula | G06F 17/30584 707/803 |
| 2012/0259840 A1* | 10/2012 | Nica | 707/719 |
| 2014/0053147 A1* | 2/2014 | Wang | G06F 8/61 717/174 |
| 2014/0108378 A1* | 4/2014 | Alpers et al. | 707/716 |
| 2014/0188451 A1* | 7/2014 | Asahara et al. | 703/13 |

* cited by examiner

FIG. 1B

SCHEMA DEFINITION 124

TABLE My_table(
 my_field1 BIGINT, my_field2 VARCHAR(200), my_field3 VARCHAR(200),
 my_field4 VARCHAR(200), my_field5 DATE, PRIMARY KEY (my_field1)
);

WORKLOAD DESCRIPTION 126

STATEMENT DESCRIPTION 127A
Statement: SELECT my_field1, my_field2, my_field3 FROM My_table;
Result: (row listing)          Performance: 3.00 seconds STATEMENT DESCRIPTION 127B
Statement: SELECT my_field1, my_field3 FROM My_table;
Result: (row listing)          Performance: 2.00 seconds

WORKLOAD DESCRIPTION 166

STATEMENT DESCRIPTION 167A
Statement: SELECT my_field1, my_field2, my_field3 FROM My_table;
Result: (row listing)          Performance: 0.30 seconds STATEMENT DESCRIPTION 167B
Statement: SELECT my_field1, my_field3 FROM My_table;
Result: (row listing)          Performance: 0.20 seconds

WORKLOAD ANALYSIS OBJECTS 158

HIERARCHY 180A
Cost: Size of Data referenced by 167A   Value: 2.7 + 1.8 = 4.5

ROOT NODE 182
Query: 127A, Referenced Data: my_field1, my_field2, my_field3
Cost: Size of Data referenced by 167A
Value: (3.00 − 0.30) = 2.7

CHILD NODE 184
Query: 127B, Referenced Data: my_field1, my_field3
Cost: Size of Data referenced by 167B
Value: (2.00 − 0.20) = 1.8

```
WEB BROWSER 190

REPORT 144

Results:

Average SELECT response time:

Database (no cache, size = 500 GB)    900 ms
Database (32 GB cache)                90 ms
Database (64 GB cache)                89 ms
Database (128 GB cache)               88 ms Click on a configuration to see a detailed schema mapping, a workload
breakdown, and the subset of database objects selected for the cache.

Commentary:
We recommend a cache size of 32 GB, which may make SELECT
statement response times up to 10 times faster.

Click here to implement a caching server according to our
recommendations, or click here for manual configuration.

Potential Compatibility Issues:

The orderDate field of the Orders table has been converted from the
"Timestamp with time zone" data type to the "Timestamp" data type.
According to schema analysis, the time zone is not currently utilized and
the conversion should not currently pose a compatibility issue.
```

202
Store a first schema definition describing a first plurality of database objects

---

204
Store a first workload description describing access to the first plurality of database objects at a first database system

---

206
Generate a second schema definition describing a second plurality of database objects, wherein each database object of the second plurality of database objects is a counter-part to one or more database objects of the first plurality of database objects, wherein the generating of the second schema definition includes, based on the first workload description and the first schema definition, selecting particular database objects in the first plurality of database objects, wherein one or more second database objects of the second plurality of database objects are counter-parts to the particular database objects

AUTOMATICALLY DETERMINING AN OPTIMAL DATABASE SUBSECTION

FIELD OF THE INVENTION

The present disclosure relates to databases, and more specifically, to automatically determining an optimal subsection of a database or another data store such as a file system or a file server.

BACKGROUND

Data processing demands continue to increase in the modern era of big data, with enterprise and data center applications demanding increasingly large data sets to be processed with minimal latency. Accordingly, an increasingly important consideration for successful application deployments is to configure database systems for optimal query performance or to provide some other operational benefit, for example higher security, user friendly data formatting, or any other benefit. On the other hand, the total cost of ownership is an important counter-balancing consideration, placing a practical upper limit to performance scaling solely by hardware upgrades.

One method of providing a performance increase or to provide other operational benefits is to introduce an alternative database system based on a different technology or engine than the original database system. For example, one alternative database system may organize data in a different fashion, such as columnar-store rather than row-store, which may provide performance benefits for certain types of data and data accesses. Another alternative database system may be designed to keep all data in-memory, allowing data to be structured and database operations to be executed in a manner that can take advantage of the assumption that all data is retrievable from relatively low-latency memory rather than high-latency disk storage.

By having the alternative database system service clients or applications that would normally be serviced by the original database system, significant performance benefits may be realized. Further, by physically positioning the alternative database system closer to the client or the application host, or even on the same host, the alternative database system can function as a front tier database cache, further improving performance by reducing transmission latencies. However, not all database operations may benefit equally when migrating to the alternative database system. In some cases, database operations may see no performance benefit or even execute more slowly than on the original database system.

Furthermore, storage constraints on the alternative database system may limit the amount of data that can be copied and cached from the original database system. The original database system may be a large multi-node system with many thousands of tables, rendering it impractical to duplicate all of the data contents from the original database system. Additionally, certain alternative database system configurations may place additional limits on the cache size. For example, in the case of an in-memory database system, the cache size is further constrained by an amount of available physical memory, which in turn may be constrained due to cost, stability, availability, and other considerations.

Since it may be impractical to duplicate all of the data from the original database system, the alternative database system should be configured with only a subsection of the database that provides the greatest performance benefit. A manual process of trial and error experimentation is often the only practical method to determine that optimal subsection. This process may extend for weeks or even months, as opportunities for comparative testing may be restricted to scheduled maintenance windows to avoid performance impacts on a production database. Thus, it may be difficult to provide an accurate estimation of any potential performance benefits within a reasonable time period. Additionally, due to the manual nature of the process, there is no promise or guarantee of optimal results, human errors may be introduced, and the process may need to be repeated again in the future to accommodate evolving data sets and data access patterns, placing a heavy and continuous management burden on the database administrator.

Based on the foregoing, there is a need for a method to facilitate the integration of an alternative database system to provide highly optimized performance benefits with minimal user intervention.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, an optimal database subsection of a database to move to an alternative database system is determined automatically. More specifically, the database subsection is selected to optimize a performance benefit when the database subsection is translated, transferred, and cached on an alternative database system, which may utilize a different technology or database engine that provides certain performance benefits compared to the original database system. Additionally, the specific technology or database engine can also be automatically selected from a variety of possibilities to provide the greatest comparative benefit, separately or in any hybrid combination. To reduce transmission latency times and provide higher performance, a host for the alternative database server may be shared with or otherwise located in close physical proximity to a database application or client layer. When the application or client issues a database query directed towards the database subsection, then the alternative database server can function as a caching database to service the database query.

To prepare the database subsection for use by the alternative database system, a schema mapping between the database schemas of the original and alternative database systems may be generated, allowing counter-part database objects to be translated from the original database objects. If any incompatibilities are encountered when creating the mapping, the incompatibilities may be automatically resolved and/or identified to the user in a report with suggestions for schema modifications to resolve the incompatibilities. A size of the database subsection may be limited such that the corresponding counter-part database objects will fit within any storage constraint, which can be calibrated up to available disk space for a disk based alternative database system, or up to free physical memory for an in-memory alternative database system.

To assist in the selection of an optimal database subsection, a repository database may be provided to manage and analyze database query workloads. The repository database may be ideally hosted separately from a target host for the original database system to avoid production database impacts and to obtain accurate performance measurements. However, for the sake of convenience, the repository database can be hosted on a shared target or client host or merged with an existing test target database. To avoid any potential loss of performance measurement accuracy in these configurations, performance measurements may be scheduled during time blocks that are separate from repository database servicing time blocks, thereby avoiding resource contention.

A lightweight capturing process attached to the original database system may capture, in real-time, database performance information for export to workload capture files, including an associated database schema definition and a workload description. The repository may receive captured workloads from prior database activity of production target hosts, which may be for specific time periods, or from example test-case simulation data. One or more task analysis workloads may then be generated by merging and combining the received captured workloads in any manner.

For a task analysis workload on a test target host, which hosts a duplicate test copy of the original database system, the task analysis workload is actually executed on the test target host. To avoid impacting a production database, the test copy may be retrieved and built from a backup rather than directly from the target host. The same capturing process may be used to create workload capture files for the task analysis workload. In this manner, each statement may be re-evaluated for accurate performance measurement, thereby avoiding contention with prior production database workloads. By using the schema mapping, the task analysis workload can also be translated and actually executed on a client host of the alternative database system, with a similar workload capture file being exported. When executing the task analysis workloads on the original and alternative database systems, the individual workload database statements may be executed in isolation without affecting the other database statements. Various methods can achieve this isolation of effect, such as avoiding a COMMIT or using a ROLLBACK for a transactional database, by executing against an isolated copy of the data, or by other methods. Accordingly, even if some statements are not compatible with the mapping, the data sets still remain consistent for both database systems. The individual workload database statements may also be repeated and averaged for a number of passes and separated into cold and warm trials.

In some cases, it may not be feasible to produce a test target host for accurate performance measurement, since sufficient infrastructure for a close hardware match of the original database system may be cost prohibitive. In this case, the actual execution of the generated workload may be omitted to avoid impacting the production database. Instead, database statistics and heuristics may be utilized to select database objects for the database subsection and to estimate a potential performance benefit. In this manner, useful results can still be provided even without a test target host. In some embodiments, it may be acceptable to use a test target host with a limited hardware infrastructure to provide a rough performance estimate or a proof of concept.

To reduce memory footprint, the actual executions of the generated workload may utilize a virtual cache. More specifically, the virtual cache transparently loads and unloads data as necessary for performance evaluation of portions of the workload, enabling the resources required by the workload to be broken into smaller pieces.

One implementation of the virtual cache arranges the workload queries into hierarchies according to shared data references. By grouping the execution of the database queries according to the hierarchies, all of the required data for a given hierarchy can be referenced in-memory within the virtual cache. Furthermore, hierarchies with related data references can also be grouped together for execution, with the related data references being retained in the virtual cache as virtual cache size permits. In this manner, memory may be managed much more efficiently than a naïve unordered execution without a virtual cache.

After the task analysis workloads are executed and the workload capture files are created, the workload capture files may be then be retrieved, imported, and analyzed on the repository. To analyze the imported workload capture files, the same hierarchies used for the virtual cache may be used. Each hierarchy is further associated with a value corresponding to a total execution time improvement and a cost corresponding to a size of the objects that are referenced by the hierarchy, as expressed in the alternative database system. To accelerate hierarchy selection, hierarchies without a positive value may be dropped from consideration, as no performance benefit is provided. By selecting from the hierarchies using algorithms such as multi-path greedy selection and/or dynamic programming, an optimal or near-optimal selection of database objects can be provided in the database subsection for any size or storage constraint. Besides performance considerations, other factors such as a type, version or configuration of the alternative database system may also be considered when selecting the database objects for the database subsection.

Once the analysis is completed, a report may be generated and presented to the user, illustrating any compatibility issues between the two database systems and the potential performance benefits from caching differently sized caches that are translated and transferred from database subsections of the original database. In some embodiments, for example when evaluating a potential complete replacement of one database system with another, a database subsection may include all the data from the original database system without any size or performance benefit restrictions. Implementation scripts may also be created to configure a client host to function as a cache or replacement system according to one of the configurations described in the report, and the scripts may be automatically executed in certain embodiments.

Accordingly, the evaluation and integration process for an alternative database system can be largely automated and completed within a relatively short turnaround time, bypassing the weeks and months of testing time typically required from a manual integration. The automated process may also be readily repeated in the future to adapt to evolving data sets and data access patterns. Optimal or near-optimal cache database subsections can be provided by using algorithms such as multi-path greedy selection and/or dynamic programming. Since a majority of the analysis may proceed on a separate repository database or a test target host, any impacts to production systems can be minimized, besides the potential minimal burden of attaching a capturing process to record a production workload. An existing capturing process may even be utilized, as many database systems may already capture statistics for performance profiling or for other reasons. In this manner, an alternative database system can be readily integrated as a cache or as a complete replacement, providing highly optimized performance benefits with minimal user intervention and minimal disruption to existing production systems.

Database Systems

Embodiments of the present invention are used in the context of database management systems (DBMSs), or simply database systems. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

A database dictionary comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

A schema definition is the formal structure that organizes and describes the database objects in the database, and may comprise integrity constraints defined in a database language. The integrity constraints may be specific for a type of the database and specific for an application that the database will be supporting. The schema definition may therefore reflect the metadata stored within the database dictionary. In the case of a relational database, the schema definition may include tables, fields, relationships, views, indexes, packages, procedures, functions, queues, triggers, types, sequences, materialized views, synonyms, database links, directories, Java, XML schemas, and other elements.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

Instead of declarative database commands, application program interfaces (APIs) may also be available that define functions, procedures, subroutines, and other interfaces for databases and data management systems. Accordingly, a client or application layer can call these APIs to retrieve and manipulate data from a database or a data management system. Thus, the methodologies described herein are not necessarily limited to database commands or SQL commands, but may also use various APIs to access non-SQL databases or data management systems such as file systems and file servers.

A multi-node database management system is made up of interconnected nodes that share access to the same database. In some cases, the database is spread out over different nodes in database shards or shared-nothing databases, which together in aggregate comprise the database. Typically, the nodes are interconnected via a network and share access, in varying degrees, to shared storage, e.g. shared access to a set of disk drives and database blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

System Overview

Figure 1A:
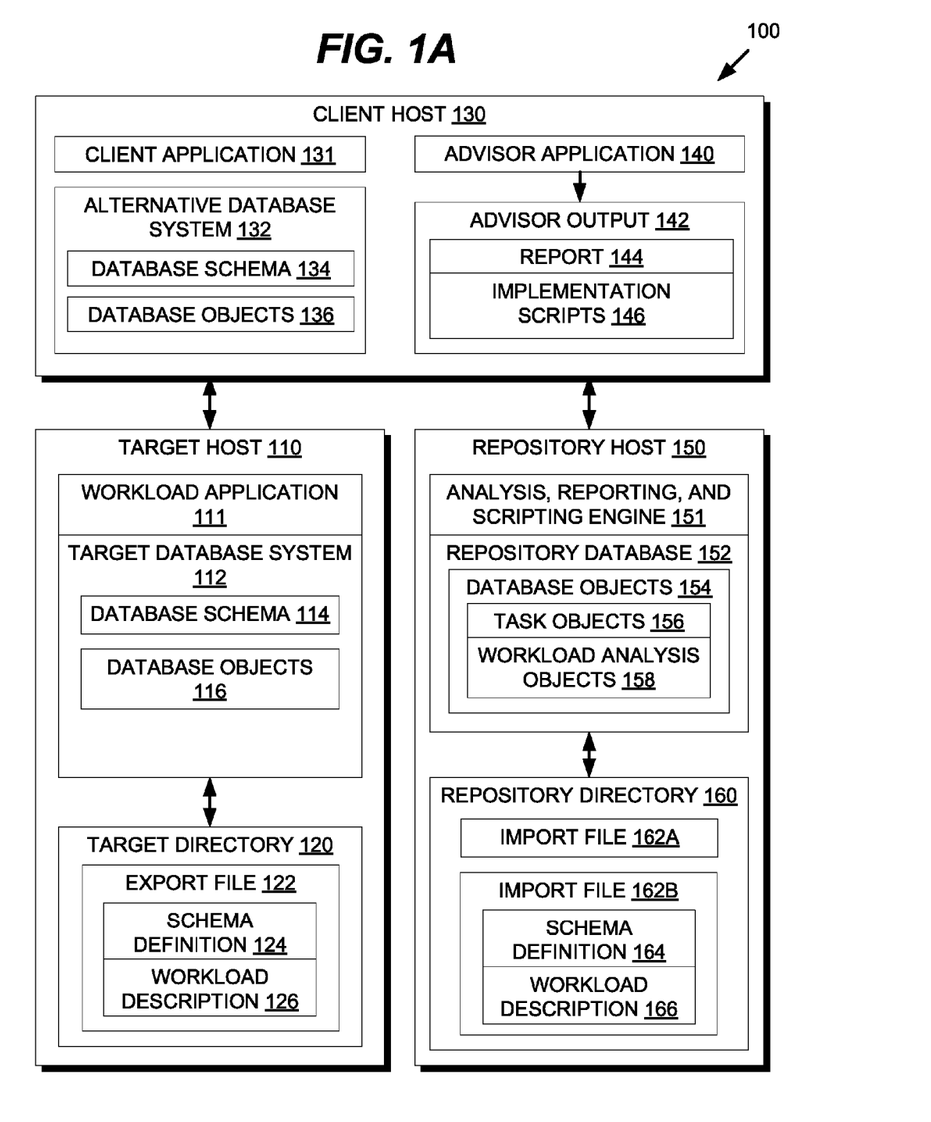
FIG. 1A is a block diagram that depicts an example system for automatically determining an optimal database subsection, according to an embodiment.

FIG. 1A is a block diagram that depicts an example system 100 for automatically determining an optimal database subsection, according to an embodiment. System 100 of FIG. 1A includes target host 110, client host 130, and repository host 150. Target host 110 includes workload application 111, target database system 112, and target directory 120. Target database system 112 includes database schema 114 and database objects 116. Target directory 120 includes export file 122, which includes schema definition 124 and workload description 126. Client host 130 includes client application 131, alternative database system 132, advisor application 140, and advisor output 142. Alternative database system 132 includes database schema 134 and database objects 136. Advisor output 142 includes report 144 and implementation scripts 146. Repository host 150 includes analysis, reporting, and scripting engine 151, repository database 152, and repository directory 160. Repository database 152 includes database objects 154, which include task objects 156 and workload analysis objects 158. Repository directory 160 includes import file 162A and import file 162B. Import file 162B includes schema definition 164 and workload description 166.

Prior to the introduction of alternative database system 132, client host 130 may only include client application 131. In some embodiments, an application layer and a client layer may be separated into a client-server model, where clients are hosted on separate client hosts and the application is hosted on an application server. Client application 131 may be any type of application that utilizes target database system 112, which may be a large-scale multi-node database system hosted on target host 110 as a production system. Accordingly, database schema 114 may describe a large amount of tables within database objects 116, and client application 131 may be one of many applications that uses target database system 112.

To improve response time performance for client application 131, a database using an alternative database technology or engine may be proposed, such as alternative database system 132, which may provide performance benefits in the form of reduced execution times for certain workloads. Since alternative database system 132 may be hosted on the same client host 130 or within close physical proximity, transmission latencies may also be reduced for client application 131, which would otherwise use a network or another transmission medium to communicate with target database system 112 of target host 110.

However, since target database system 112 may be a very large scale database, it may be impractical to translate the entirety of database objects 116 into database objects 136. Further, since alternative database system 132 may be a type of database that puts storage constraints on database objects 136, such as an in-memory database, the database subsection that can be translated from database objects 116 may be further limited in size. Accordingly, it becomes important to formulate a database subsection of database objects 116 that can provide optimal performance gains when the database subsection is translated into database objects 136. Without formulating an optimal database subsection, it may be difficult to determine the potential performance benefits that would justify the integration of alternative database system 132. As discussed above, manual trial-and-error methods for determining the database subsection do not guarantee an optimal result and often require extended turnaround times that may not be practical for an evaluation phase.

Accordingly, an advisor application 140 is proposed that automates the process of determining the optimal database subsection, allowing the user to easily ascertain the potential performance benefits of alternative database system 132 for various cache sizes, which may be described within report 144 of advisor output 142. Further, advisor application 140 may also make a recommendation for a particular database technology or engine to use for alternative database system 132, such as disk-based, in-memory, object-oriented, relational, columnar-store, row-store, or any other technology or hybrid combination of technologies to provide the greatest comparative benefit. For portability and ease of viewing, report 144 may be formatted as hypertext markup language (HTML), viewable in any web browser. Additionally, implementation scripts 146 may be generated and optionally executed automatically to configure alternative database system 132 as a caching or replacement database system for target database system 112, according to one of the configurations described within report 144.

A separate repository host 150 is provided so that the analysis tasks, reporting, and scripting can proceed on repository database 152, separate from target database system 112, to avoid impacting a production database. However, for integration flexibility, various configurations of system 100 are also possible. In one configuration, repository host 150 may be merged into client host 130, simplifying system 100 at the potential cost of some measurement accuracy when performing performance evaluation on alternative database system 132. In other configurations, when target host 110 is a test target host, repository host 150 may be merged into target host 110, with repository database 152 either standing alone or being integrated with target database system 112. Again, this may simplify system 100 at the potential cost of some measurement accuracy when performing performance evaluation on target database system 112. In another simplified configuration, all hosts of system 100 may be shared on a single host, such as a laptop, which may be useful for demonstration and proof of concept purposes.

To mitigate or avoid any potential loss of performance measurement accuracy when using combined host configurations as discussed above, performance measurements may be scheduled during time blocks that are separate from repository database servicing time blocks. By using standard virtual memory technology to service the time blocks, most or all memory contention can be eliminated. However, this may raise the potential for disk space contention if insufficient disk space is available, in which case it may be desirable to add additional storage or use a configuration with separate host systems.

Database Subsection Selection Process

Figure 2:
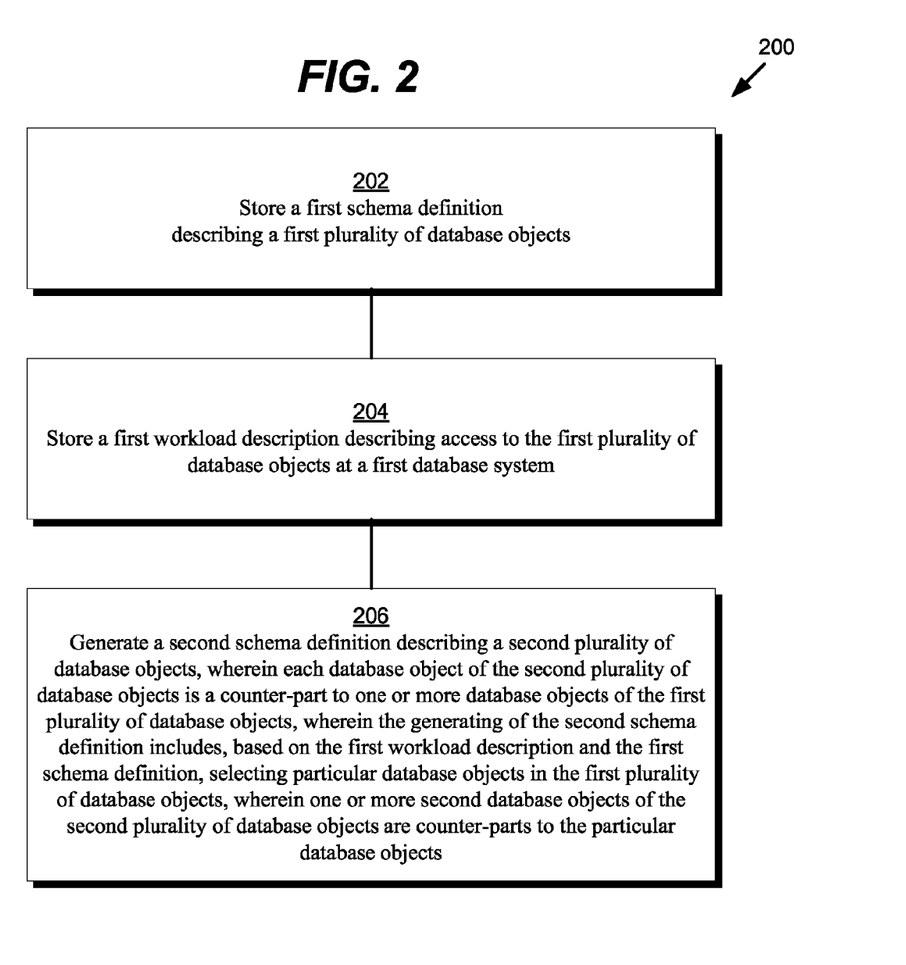
FIG. 2 is a flow diagram that depicts a process for automatically determining an optimal database subsection, according to an embodiment.

With a basic outline of system 100 now in place, it may be instructive to review a high level overview of the processing steps to automatically determine the optimal database subsection of a database. Turning to FIG. 2, FIG. 2 is a flow diagram that depicts a process 200 for automatically determining an optimal database subsection, according to an embodiment. For the purposes of process 200, it may be assumed that all relevant database cache users, privileges, metadata, and other structures are already defined at target database system 112, alternative database system 132, and repository database 152 such that advisor application 140 can trigger analysis tasks and coordinate between the different database systems. This may be accomplished by using a setup configuration script, which may be automatically generated and executed prior to process 200.

Storing a Schema Definition

At block 202 of process 200, referring to FIG. 1A, advisor application 140 stores schema definition 124 describing database objects 116. More specifically, advisor application 140 triggers a capturing process attached to target database system 112 to export database schema 114 as schema definition 124 within export file 122. In some embodiments, schema definition 124 may be stored in a proprietary binary format. Target directory 120 may be a directory in a file system of target host 110, which may have permissions set by access control lists or other methods such that advisor application 140 can access and retrieve the files placed in target directory 120, including export file 122. Repository directory 160 may be a directory in a file system of repository host 150, which may have permissions set such that advisor application 140 can write files into repository directory 160. Accordingly, advisor application 140 may retrieve export file 122 from target directory 120 to be placed in repository directory 160 as import file 162A for importing and further analysis.

While the example illustrated in FIG. 1A uses remotely accessible file system directories for data transfer, in general any manner of data transfer may be utilized to exchange data, including schema definitions and workload descriptions, between the target, client, and repository hosts and databases. For example, instead of exporting and importing the data in and out of filesystem files, the data may be streamed through open database connections. In this manner, the initial setup process may be greatly simplified since no special directories need to be created and no access permissions need to be set on the directories.

Performance Evaluation to Store a Workload Description

At block 204 of process 200, referring to FIG. 1A, advisor application 140 stores workload description 126 describing access to database objects 116. More specifically, the same capturing process attached to target database system 112 may export workload description 126 in real-time when advisor application 140 triggers a task analysis workload to be executed on target database system 112. Preferably, this occurs on a target host 110 as a test target host, which hosts a duplicate of the original production database. To avoid impacting the production database, the test target host may be rebuilt from a backup rather than being directly copied from the production database.

The specific task analysis workload may be generated by using repository database 152, which may maintain captured workloads from prior production database activity of target host 110. In some embodiments, the task analysis workload may utilize workloads from specific time periods, for example to provide a cache tailored to specific workload schedules, such as a holiday workload. Additionally, the task analysis workload may be generated by merging and combining captured workloads from various target hosts, for example to create a cache that services multiple database systems. In other embodiments, the task analysis workload may be derived from example test-case simulation data rather than from captured database activity. Once a task analysis workload is generated, the task analysis workload along with any related task information may be stored within task objects 156.

Compatibility Verification

Prior to the actual performance evaluation of the task analysis workload, a compatibility verification step may be first carried out to determine any potential incompatibilities between database schemas 114 and 134. A process for creating database schema 134 is discussed in greater detail below under the "MAPPING THE SCHEMA DEFINITION" heading.

If it is desirable to limit resource overhead, a limited compatibility verification analysis can be carried out, which can test for a large portion of compatibility issues without requiring an actual execution of the task analysis workload. The task analysis workload is instead compiled or parsed at target database system 112 using database schema 114, and a counter-part task analysis workload is compiled or parsed at alternative database system 132 using database schema 134. A process for creating the counter-part task analysis workload is described below under the "COUNTER-PART DATABASE OBJECTS AND WORKLOAD" heading. Since the compiling or parsing does not require an actual execution that would reference data, a transferring and translating of database objects 116 into database objects 136 can be omitted, further reducing resource overhead.

Additionally, this verification analysis process may be applied to non-SQL databases that use APIs, where the task analysis workloads are tested through API calls that do not require actual execution. Even if the API calls require an execution of the task analysis workload, the execution may be carried out on empty or stub data objects that provide enough data for the API calls to complete. These API calls may be completed much more quickly than an actual execution on actual data objects.

If a full compatibility verification analysis is desired, then an actual execution pass over each statement in the task analysis workload may be carried out. Advisor application 140 may direct workload application 111 to issue statements for target database system 112 to execute a single pass of the task analysis workload described in task objects 156. Workload application 111 may individually issue the workload database statements from the task analysis workload so that they can be executed in isolation without affecting the other database statements. As previously discussed, this isolation of effect may be achieved by avoiding a COMMIT, by using a ROLLBACK, by executing against an isolated copy of the data, or by other methods. Accordingly, the state of database objects 116 is preserved.

To reduce resource requirements when executing the task analysis workload for the full compatibility verification, target database system 112 may utilize a virtual cache, as discussed in further detail below under the heading "VIRTUAL CACHE FOR PERFORMANCE EVALUATION".

In response to target database system 112 executing the statements issued by workload application 111, a capturing process attached to target database system 112 may store workload description 126 into export file 122, reflecting a compatibility testing of the task analysis workload. As previously described, export file 122 may be retrieved and stored as import file 162A.

Alternative database system 132 may be directed, via advisor application 140, to perform a similar compatibility verification pass for a counter-part task analysis workload, which also preserves the state of database objects 136. A more detailed description for the setup and carrying out of this counter-part task analysis workload is provided below under the headings "MAPPING THE SCHEMA DEFINITION" and "COUNTER-PART DATABASE OBJECTS AND WORKLOAD". A capturing process attached to alternative database system 132 may store workload description 166 into an export file, reflecting a compatibility testing of the counter-part task analysis workload. The export file may be retrieved and stored as import file 162B.

After the compatibility verification passes are completed, analysis, reporting, and scripting engine 151 may import the data from import files 162A-162B and verify that the results in the workload descriptions are consistent with each other. To begin the verification process, the result of each individual statement execution in workload description 126 may be compared against the result for the corresponding execution in workload description 166. If the results match, then it may be concluded that the mapping for that statement is compatible. Otherwise, it may be noted in report 144 that an incompatibility may exist for the statement, for the counter-part database object, or for the schema mapping. Alternative mappings or schema modifications may be proposed to address the incompatibilities listed in report 144.

To accelerate the comparison process, checksums on the results may be compared rather than comparing the results directly. The checksum may be bit rotated or otherwise adjusted after each row or record if the ordering of the results should be preserved, for example as may be the case with a SQL query using an ORDER BY clause.

Performance Evaluation of the Task Analysis Workload

After the compatibility verification step, advisor application 140 may then direct workload application 111 to issue statements for target database system 112 to execute the task analysis workload described in task objects 156 for a performance evaluation. In an alternative embodiment, a separate program may substitute for workload application 111 to achieve the same effect, where the separate program is able to issue statements for execution by both target database system 112 and alternative database system 132. When the separate program is utilized, alternative database system 132 may use a virtual cache for loading and unloading data from database objects 116, whereas target database system 112 may bypass the virtual cache since database objects 116 are already loaded. However, since the loading/unloading of the data and the performance evaluations may be scheduled in different time blocks, the performance evaluations may nevertheless be carried out using identical measurement methods on both database systems.

As with the compatibility verification, workload application 111 may individually issue the workload database statements from the task analysis workload so that they can be executed in isolation without affecting the other database statements. Similarly, to reduce resource requirements when executing the task analysis workload, target database system 112 may continue to utilize the virtual cache, as discussed in further detail below under the heading "VIRTUAL CACHE FOR PERFORMANCE EVALUATION".

To provide a more accurate performance evaluation, target database system 112 may repeat each individual workload database statement for a number of passes, which may be averaged. Furthermore, the passes may be separated into distinct cold and warm trials. For example, a number of cold trials may be first conducted, which transparently loads the required data references into internal database and system buffers. Next, a number of warm trials are conducted, where the required data references are already loaded. The results of cold and warm trials may be stored separately and may be averaged for a number of passes in each trial. These distinct cold and warm trial results may be used to provide more finely tuned performance estimates.

In response to target database system 112 executing the statements issued by workload application 111, a capturing process attached to target database system 112 may store workload description 126 into export file 122, reflecting a performance evaluation of the task analysis workload. As previously described, export file 122 may be retrieved and stored as import file 162A.

Mapping the Schema Definition

A similar performance evaluation may also be applied with respect to alternative database system 132 of client host 130. However, a corresponding database schema with counter-part database objects should first be translated from the original database system. Accordingly, at block 206 of process 200, referring to FIG. 1A, system 100 generates schema definition 164 describing database objects 136, wherein each database object of database objects 136 is a counter-part to one or more database objects of database objects 116. Schema definition 164 may also embody any modifications to enable support by the database technology or engine of alternative database system 132. Schema definition 164 may be stored as database schema 134 when stored as metadata in alternative database system 132. Additionally, a means is provided to replicate database objects 116 in its original form to database objects 136 in its alternative form, for example by translating database objects 116 using the schema mapping as described below, and then transferring the translated objects from target database system 112 to alternative database system 132.

Since the database engines or technologies of target database system 112 and alternative database system 132 may differ, database schema 114 of target database system 112 may be generally unusable at alternative database system 132 without applying some level of transformation. For example, target database system 112 may support certain data types that are unsupported at alternative database system 132. The database systems may also use different query syntaxes such as SQL, XML, and JavaScript Object Notation (JSON). The database systems may also use different data storage representations including relational row-store data, relational column-store data, object-oriented data, and in-memory data. Metadata structures such as indexes may also differ between the two database systems. Even if the database systems use the same database technology, it may nevertheless be desirable to apply certain transformations, for example to present a user-friendly denormalized materialized view for client application 131.

Accordingly, a mapping may be generated to transform database schema 114 into a compatible database schema 134 that is usable by alternative database system 132. To derive the mapping, static and dynamic analysis may be carried out on the known data types, query syntaxes, and other known properties of the original and alternative database systems. However, it may not always be possible to create a direct mapping that is completely compatible and without any semantic differences.

For example, target database system 112 may support a timestamp with time zone data type, whereas alternative database system 132 may only support a simple timestamp. In this case, it is possible to provide a mapping where timestamps with time zone are translated to a simple timestamp according to a single time zone, such as GMT. However, in the process of such a translation, the time zone data is lost, and any queries, functions, and other operations that utilize the time zone will no longer function correctly. Even if there are no existing operations that utilize the time zone, it is possible that future operations may begin to use the time zone.

In another example, target database system 112 may support a binary large object (LOB) up to a maximum filesystem file size, whereas alternative database system 132 may only support a variable sized character string (VAR-CHAR) up to a certain size. A mapping may be created for translating a LOB into a VARCHAR, but since the certain size may not be as large as the maximum filesystem file size, large sized LOBs may be truncated in the mapping.

Accordingly, the user may be warned of these potential compatibility issues in report 144, which may also suggest schema modifications and alternative translations. For example, for the timestamp with time zone mapping, report 144 may suggest the creation of an additional table column to store the time zone value, with database operations and other schema elements also modified correspondingly. For the LOB to VARCHAR mapping, report 144 may suggest the use of a linked list of VARCHARs for large LOBs, or may suggest the use of a VARCHAR that is a symbolic link to a filesystem file, with database operations and other schema elements also modified correspondingly. In some embodiments, the most compatible and/or least disruptive schema modification may be automatically selected without any user input, with report 144 showing the particular schema modification that was selected.

Counter-Part Database Objects and Workload

After the mapping is generated, the mapping may be applied to translate database objects 116 into database objects 136. Thus, each database object of database objects 136 is a counter-part to one or more database objects of database objects 116. A single database object of database objects 136 may correspond to multiple data objects of database objects 116 and vice versa, due to differences in data representations and potential schema modifications for mapping compatibility, as discussed above.

With alternative database system 132 now fully populated with database schema 134 and database objects 136, performance evaluation on alternative database system 132 may proceed by applying the mapping to the task analysis workload in task objects 156 to create a counter-part task analysis workload. Advisor application 140 may then issue statements for alternative database system 132 to execute the counter-part task analysis workload in a manner similar to workload application 111 with respect to target database system 112, as described above. Similarly, alternative database system 132 may also utilize a virtual cache to reduce resource overhead, as discussed below under the "VIRTUAL CACHE FOR PERFORMANCE EVALUATION" heading.

Thus, advisor application 140 may individually issue the workload database statements from the counter-part task analysis workload so that they are executed on alternative database system 132 in isolation without affecting the other database statements. As previously discussed, this isolation of effect may be achieved by avoiding a COMMIT, by using a ROLLBACK, by executing against an isolated copy of the data, or by other methods. Accordingly, the state of database objects 136 is preserved. As with the previous task analysis workload, each individual workload database statement may also be repeated for a number of passes, which may be averaged and/or split into distinct cold and warm trials. In response to alternative database system 132 executing the statements issued by advisor application 140, a capturing process attached to alternative database system 132 may store workload description 166 into an export file, reflecting a performance evaluation of the counter-part task analysis workload. Schema definition 164 may also be written into the export file. The export file may then be copied to repository directory 160 as import file 162B.

Database Subsection Selection

Continuing with block 206 of process 200, referring to FIG. 1A, advisor application 140 continues to select particular database objects in database objects 116, wherein one or more second database objects of database objects 136 are counter-parts to the particular database objects, and the selecting is based on schema definition 124 and workload description 126. In other words, the particular database objects may correspond to the optimal database subsection. In a case where there are no restrictions to the size and performance benefits of the selection, then the entirety of database objects 116 may be selected, which may be appropriate for evaluating whole-system database migrations. However, in most cases, one or more size and performance optimization constraints may be imposed when selecting the particular database objects. Additional factors such as a type, version or configuration of the alternative database system may also be considered when selecting the particular database objects for the database subsection.

In the case where performance evaluation by actual execution of the task analysis workload is not feasible, then general database statistics retrieved from target database system 112 and various heuristics may instead be utilized to select the particular database objects for the database subsection. For example, database columns or rows that are referenced repeatedly within the task analysis workload may be preferred candidates for selection. In another example, database columns or rows referenced in database statements with relatively long execution times, as indicated by the general database statistics, may also be preferred candidates for selection. Additionally, to provide a quicker analysis result, a size of the one or more second database objects may be estimated from the general database statistics in lieu of converting by the schema mapping and calculating the size directly. For example, the size may be based on the average size of referenced rows and columns, which may be indicated in the general database statistics.

On the other hand, when the selection of the particular database objects can rely on schema definition 124 and workload description 126, which are captured from an actual execution of the task analysis workload, then the selection can be optimized to maximize a reduction in execution time while fitting the one or more second database objects into any storage constraint. Note that since the counter-part objects for database objects 116 are available as database objects 136, a direct measurement of the size of the one or more second database objects is readily achieved, and the size may also include the size of any supporting metadata as well, such as indexes or other structures.

As discussed above, after deriving a mapping between schema definition 124 and schema definition 164, a corresponding task analysis workload may be executed on alternative database system 132 to export workload description 166 for the one or more second database objects, which are translated from the particular database objects. Thus, the results of the actual executions on target database system 112 and alternative database system 132 are available to import from import files 162A and 162B, respectively. Analysis, reporting, and scripting engine 151 may thus proceed to analyze the actual execution results to select an optimal or near-optimal selection of the particular database objects as a database subsection of database objects 116.

To provide a useful range of data points, block 206 may be repeated for several different storage constraints up to a physical storage constraint of client host 130. For example, if client host 130 has 128 gigabytes of free storage, whether disk space for a disk-based database or memory for an in-memory database, then block 206 may be repeated using cache sizes of 32 gigabytes, 64 gigabytes, and 128 gigabytes to give the user an idea of the possible performance benefits (values) with various amounts of storage (costs), and also the point where one may encounter diminishing returns. In some embodiments, a continuous range of value cost pairs may be evaluated by using algorithms similar to dynamic programming or hybrid dynamic programming with greedy algorithms for pruning the search space. In this case, a value to cost graph may be presented to the user. User-defined storage constraints may also be supported. In this manner, the user may be able to gauge and plan the optimal amount of storage for present and future database caching needs. Alternatively, a specific cache size configuration may be automatically selected based on the best performance to cache size ratio.

Workload Hierarchies for Selection Algorithms

Figure 1B:
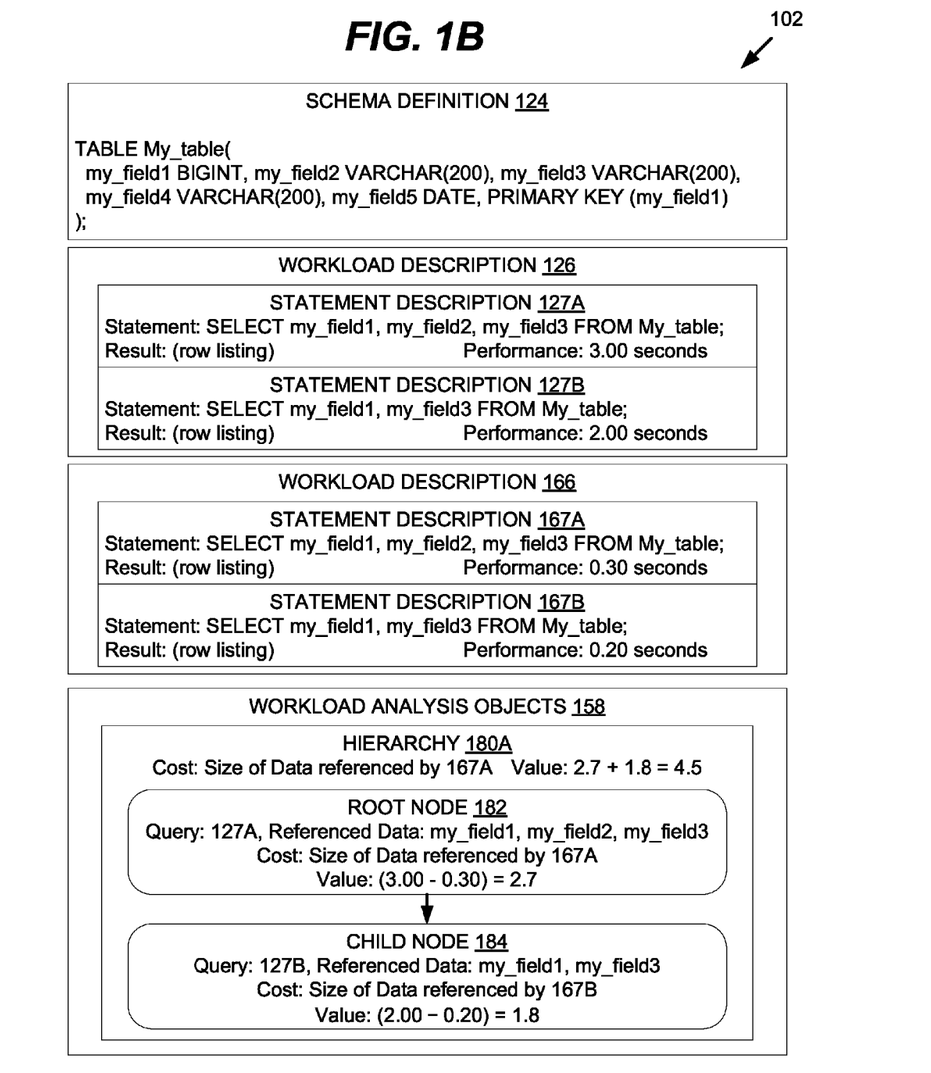
FIG. 1B is a block diagram that depicts an example workload analysis for automatically determining an optimal database subsection, according to an embodiment.

To provide a specific example for the database subsection selection of block 206, FIG. 1B is a block diagram that depicts an example workload analysis for automatically determining an optimal database subsection, according to an embodiment. Diagram 102 of FIG. 1B includes schema definition 124, workload description 126, workload description 166, and workload analysis objects 158. Workload description 126 includes statement description 127A and statement description 127B. Workload description 166 includes statement description 167A and statement description 167B. Workload analysis objects 158 include hierarchy 180A, which includes root node 182 and child node 184. With respect to FIG. 1B, like numbered elements may correspond to the same elements from FIG. 1A.

As shown in FIG. 1B, schema definition 124 defines a table "My_table", which may reference several rows of data that are stored in database objects 116. Workload description 126 includes two individual statement executions described by statement description 127A and 127B. Statement description 127A returns a result that includes the columns "my_field1", "my_field2", and "my_field3" for all rows within "My_table" of database objects 116, with an execution time of 3.00 seconds. Statement description 127B returns a result that includes the columns "my_field1" and "my_field3" for all rows within "My_table" of database objects 116, with an execution time of 2.00 seconds. Statement description 167A returns a result that includes the columns "my_field1", "my_field2", and "my_field3" for all rows within "My_table" of database objects 136, with an execution time of 0.30 seconds. Statement description 167B returns a result that includes the columns "my_field1" and "my_field3" for all rows within "My_table" of database objects 136, with an execution time of 0.20 seconds. For simplicity, the row listings of the results are not specifically shown in FIG. 1B.

With the information provided in workload description 126 and 166, workload analysis objects 158 can be populated with hierarchy 180A, since statement descriptions 127A-127B describe access to common data. The query set of hierarchy 180A includes the queries reflected by statement description 127A and 127B, which are represented by root node 182 and child node 184, respectively. Root node 182 describes access to a parent database object set, or the columns "my_field1", "my_field2", and "my_field3". All queries in the query set describe access to database objects within the parent database object set. In other words, the parent database object set contains all possible data references for the entire hierarchy. While only a single hierarchy 180A is shown in FIG. 1B, in other embodiments, multiple hierarchies may be formed from a large number of statement descriptions in a workload.

As shown in hierarchy 180A, each node has an associated cost reflecting the size of the counter-part data when stored in database objects 136, and each node has an associated value reflecting an execution time reduction when comparing an execution time of the original query on target database system 112 with an execution time of a translated query on alternative database system 132. In the example shown in FIG. 1B, alternative database system 132 may correspond to an in-memory relational database, which may provide a large performance benefit.

The entire hierarchy 180A also has an associated cost and value. The cost is the same as the cost for root node 182, but the value is for the entire query set, or the total sum of the values from all the nodes in the hierarchy. Thus, the value of hierarchy 180A is 4.5, since root node 182 provides a 2.7 second execution time reduction and child node 184 provides a 1.8 second execution time reduction.

When a non-trivial workload is analyzed, then workload analysis objects 158 may be populated with a large number of hierarchies, and some hierarchies may have overlapping data references with other hierarchies. In this case, a selection algorithm is necessary to choose an optimized hierarchy set from the available hierarchies. One method is the dynamic programming method, which provides near-optimal results but utilizes extensive recursion that does not scale well with larger workloads. Another method is the greedy selection algorithm, where the hierarchies are sorted by value to cost and the highest ranked hierarchy is selected. While the greedy selection algorithm provides higher performance, an optimal solution is not guaranteed. Accordingly, the specific algorithm to use may depend on the size of workload description 126, for example by using dynamic programming for relatively small workloads and greedy selection for larger workloads. In some embodiments, a hybrid may be implemented, where greedy search is used to prune the initial search space to be used by the dynamic programming search. The selection algorithm may be repeated to select optimal hierarchies for the database subsection until a relevant storage constraint is met.

Hierarchies do not necessarily have mutually exclusive parent database object sets and may have overlapping or related data references. Accordingly, when utilizing a greedy selection algorithm to select a hierarchy, any related hierarchies must have their costs reduced. Choosing a hierarchy effectively decreases the cost for selecting related hierarchies, as the related data references are already selected in the database subsection. However, this change in the related hierarchies requires a resorting of the hierarchies to select the next optimal hierarchy, which may impose a high overhead. To reduce such resorting overhead, the hierarchies may be materialized into an ordered index, allowing resorts to be incremental to local areas rather than to the entire list of hierarchies. Other metadata structures may also be provided for a similar result.

To provide a higher probability of optimal results when using the greedy selection algorithm, a multi-path greedy selection algorithm may be utilized, where several greedy selection paths are used that are weighted across a spectrum of different priorities. At one end maximizing the value is the highest priority, at the opposite end minimizing the cost is the highest priority, and in the middle the two concerns are balanced. By using a sufficient number of paths, for example ten (10), optimal or near-optimal results may be provided.

To accelerate the hierarchy selection process, some pre-processing may be applied to reduce the potential list of hierarchies. For example, hierarchies that already singly exceed a relevant storage constraint may be removed from consideration. Thus, while calculating the cost of each node in a particular hierarchy, if a particular node ever exceeds the relevant storage constraint, then the entire hierarchy can be immediately removed from consideration. If the hierarchy is the child of other parent hierarchies, then those parent hierarchies can also be removed as well. Hierarchies with a zero or negative value may also be removed from consideration, as no performance benefit will be provided. However, as previously discussed, some embodiments may impose no performance or storage constraints when a complete replacement of a database system is under consideration.

Virtual Cache for Performance Evaluation

The same hierarchies used in the database subsection selection process of block 206 can also be used to implement a virtual cache during the previous task analysis workload executions. Rather than naively executing the task analysis workloads in the given order, the hierarchies can be used to group the executions together such that the parent database object set for each hierarchy can be cached into the virtual cache to serve all queries for each hierarchy in-memory. Additionally, hierarchies with shared data accesses can also be grouped for execution together, with at least a portion of the shared data kept in the virtual cache, as space permits, to service the related hierarchies. Data that is no longer referenced by any pending hierarchies may also be flushed from the virtual cache. Accordingly, by using the virtual cache, only enough physical memory to accommodate the single largest query in the workload is needed to evaluate all of the statements in-memory. Thus, memory consumption may be kept low while maintaining high performance.

Alternate Database Technology Selection Process

Besides selecting the optimal database subsection for an alternative database system, process 200 may also be applied to determine an optimal alternative database system among many different alternative database systems, which may use one or more database technologies singly or in any combination. For example, different alternative database technologies that could be evaluated and compared include in-memory row-based database, in-memory columnar store database, a combination thereof, or even XML based database systems. The different alternative database system configurations may be evaluated based on degree of compatibility, performance advantage, resource requirements, and other criteria, and an optimal configuration may be selected using similar greedy selection and dynamic programming algorithms, as previously discussed with respect to process 200.

Report and Implementation Scripts

Figure 1C:
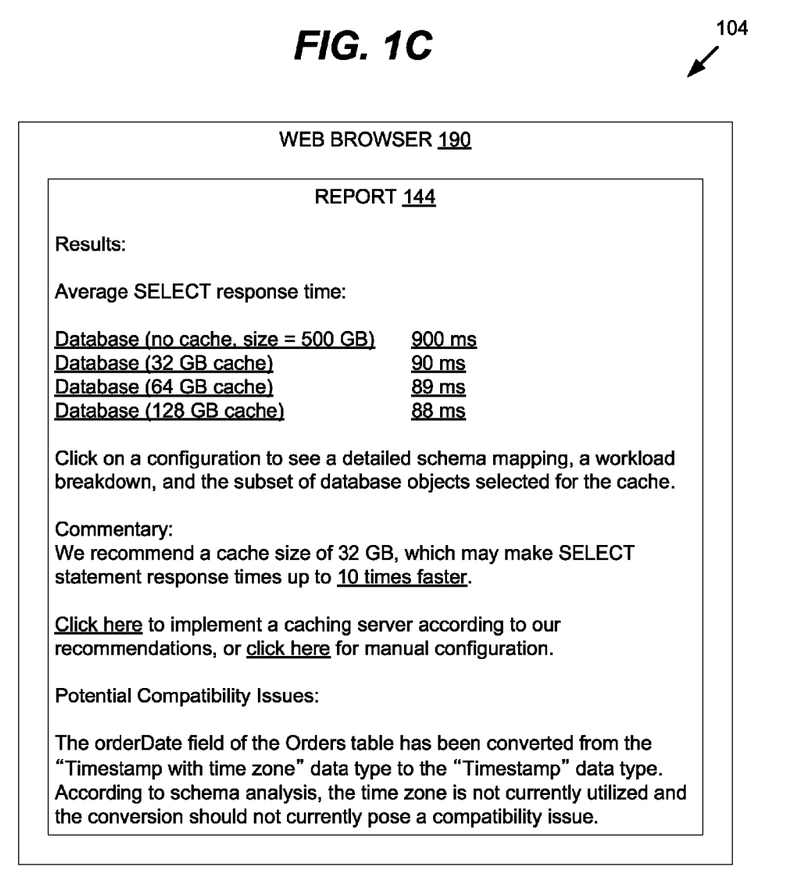
FIG. 1C is a block diagram that depicts an example user interface for automatically determining an optimal database subsection, according to an embodiment.

After the completion of process 200, analysis, reporting, and scripting engine 151 may generate report 144 and one or more implementation scripts 146 within advisor output 142. Turning to FIG. 1C, FIG. 1C is a block diagram that depicts an example user interface for automatically determining an optimal database subsection, according to an embodiment. Diagram 104 of FIG. 1C includes web browser 190, which displays a report 144. Report 144 may correspond to report 144 from FIG. 1A.

As shown in report 144, a large amount of information is presented to the user including the particular database objects selected for the database subsection, a mapping between the schema definitions, a list of potential compatibility issues, and a projected performance benefit when configuring the alternative database system as a caching database for the target database system. As previously discussed, block 206 may be repeated to provide results for various cache sizes, as illustrated in report 144. Since the 64 GB and 128 GB configurations only provide a marginal performance improvement, the smaller 32 GB configuration may be recommended to the user, and a link may be provided to execute implementation scripts 146, which may configure alternative database system 132 as a caching database for target database system 112, according to the details shown in report 144. In some embodiments, advisor application 140 may automatically select the recommended configuration and cause implementation scripts 146 to be automatically executed.

Accordingly, database objects 136 may be configured to load only the counter-part objects of the selected optimal database subsection. When alternative database system 132 can answer queries with the data in database objects 136, it may do so; otherwise, the query is passed to the original target database system 112. Depending on specific application requirements and the relative composition of read-only queries versus data manipulation language statements that modify data, the cache may be configured as a read-only cache, an asynchronous write-through cache, a synchronous write-through cache, or another cache configuration.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
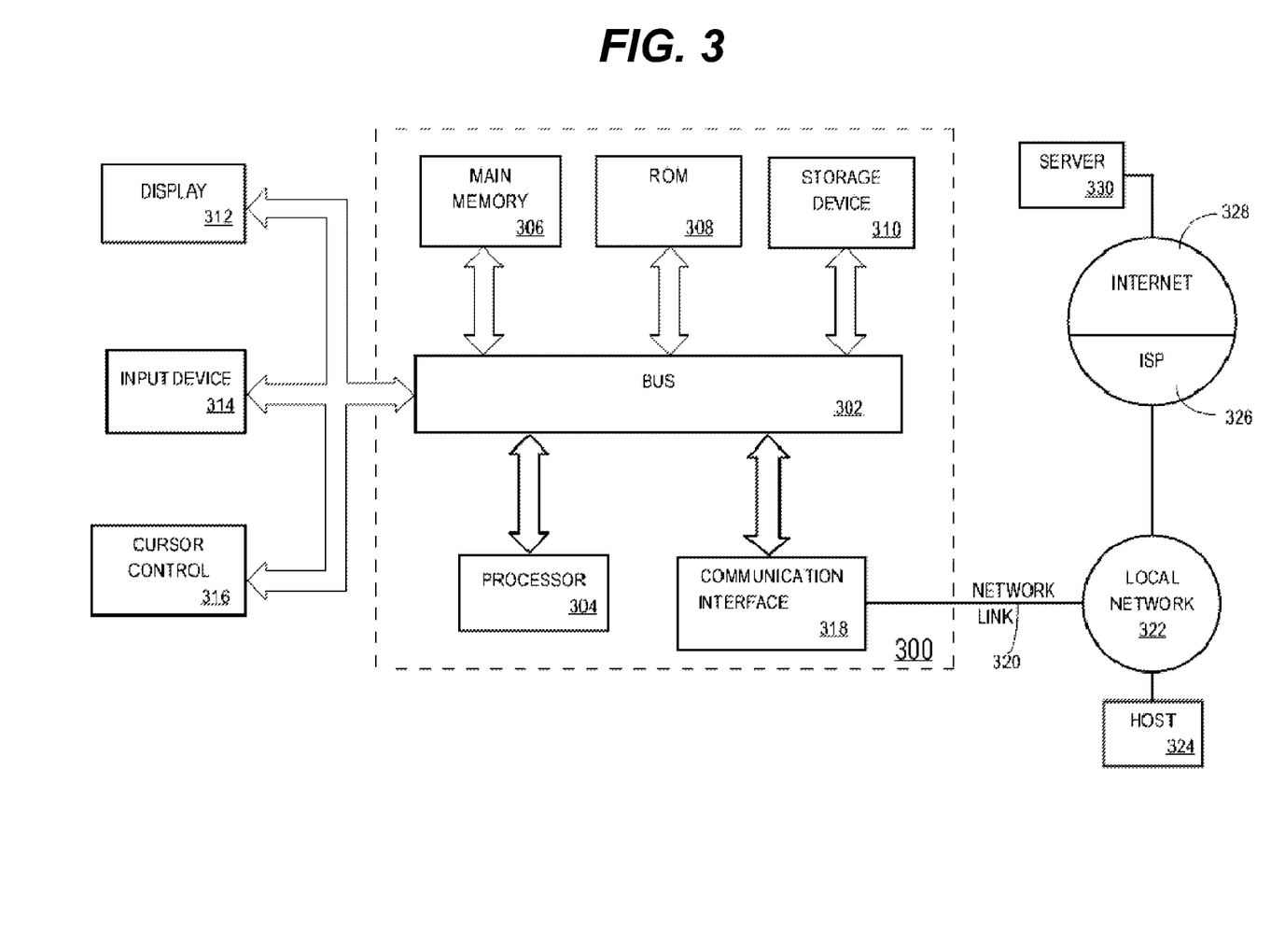
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   storing a first schema definition describing a first plurality of database objects;
   storing a first workload description describing access to the first plurality of database objects at a first database system, wherein the first workload description comprises information about execution of queries against at least a portion of the first plurality of database objects;
   generating a second schema definition describing a second plurality of database objects,
      wherein each database object of the second plurality of database objects is a counter-part to one or more database objects of the first plurality of database objects and is compatible with a second database system;
      wherein the generating of the second schema definition includes, based on the first workload description and the first schema definition, selecting a subset of database objects to translate to a particular form that is described by said second schema definition and that is compatible with the second database system, wherein the subset of database objects belong to said first plurality of database objects.

2. The method of claim 1, wherein the selecting of the subset of database objects is such that a size of the one or more second database objects fits within a storage constraint.

3. The method of claim 2, wherein the storage constraint is based on an available memory size of the second database system for storing the one or more second database objects, wherein the second database system is an in-memory database system.

4. The method of claim 1, wherein the selecting of the subset of database objects is based on a type, a version, or a configuration of the second database system for storing the one or more second database objects.

5. The method of claim 1, wherein the selecting of the subset of database objects is based on maximizing a reduction in execution time when the second database system services database queries on the particular subset of database objects.

6. The method of claim 5, wherein the reduction in execution time is estimated based on statistics of the first database system.

7. A method comprising:
   storing a first schema definition describing a first plurality of database objects;
   storing a first workload description describing access to the first plurality of database objects at a first database system;
   generating a second schema definition describing a second plurality of database objects, wherein each database object of the second plurality of database objects is a counter-part to one or more database objects of the first plurality of database objects;
   wherein the generating of the second schema definition includes, based on the first workload description and the first schema definition, selecting particular database objects in the first plurality of database objects, wherein one or more second database objects in the second plurality of database objects are counter-parts to the particular database objects;
   wherein the first workload description comprises a plurality of queries, and wherein the selecting of the particular database objects comprises:
      arranging the plurality of queries into a plurality of hierarchies, wherein:
         each hierarchy includes a query set having a root query on a parent database object set, wherein all queries in the query set are on database objects within the parent database object set;
         each hierarchy is associated with a value reflecting an execution time reduction when comparing an execution time of the query set on the first database system to an execution time of a corresponding query set on a second database system, wherein the corresponding query set is on a corresponding set of database objects in the second plurality of database objects that are counter-parts to the parent database object set;
      determining an optimized hierarchy set from the plurality of hierarchies based on maximizing a total value of the optimized hierarchy set when the particular database objects are selected to include the parent database object set from each of the root queries of the optimized hierarchy set.

8. The method of claim 7, wherein for each hierarchy of the plurality of hierarchies, the execution time of the query set and the execution time of the corresponding query set are measured by a first actual execution of the query set on the first database system and a second actual execution of the corresponding query set on the second database system.

9. The method of claim 8, wherein the first actual execution uses a test database system of the first database system.

10. The method of claim 8, wherein at least one of the first actual execution or the second actual execution is grouped according to the plurality of hierarchies to execute in-memory.

11. The method of claim 10, wherein the at least one of the first actual execution or the second actual execution is further grouped by hierarchies on shared database objects, wherein at least a portion of the shared database objects is retained in-memory between the at least one of the first actual execution or the second actual execution of the hierarchies on the shared database objects.

12. The method of claim 7, wherein the determining of the optimized hierarchy set utilizes one or more of a multi-path greedy selection algorithm and a dynamic programming algorithm.

13. The method of claim 7, wherein an algorithm for the determining of the optimized hierarchy set is chosen based on a size of the first workload description.

14. The method of claim 1, further comprising:
   determining one or more database technologies of the second database system for storing the one or more second database objects.

15. The method of claim 1, further comprising outputting a report describing the subset of database objects, a mapping from the first schema definition to the second schema definition, a list of potential compatibility issues, and a projected performance benefit when servicing the one or more second database objects on the second database system.

16. The method of claim 1, further comprising generating one or more scripts to configure the second database system as a caching system for the first database system, wherein a database query on the subset of database objects of the first database system is serviced by the second database system translating the database query to the second schema definition.

17. A non-transitory computer-readable medium storing one or more sequences of instructions which, when executed by one or more processors, cause:
> storing a first schema definition describing a first plurality of database objects;
> storing a first workload description describing access to the first plurality of database objects at a first database system, wherein the first workload description comprises information about execution of queries against at least a portion of the first plurality of database objects;
> generating a second schema definition describing a second plurality of database objects,
>> wherein each database object of the second plurality of database objects is a counter-part to one or more database objects of the first plurality of database objects and is compatible with a second database system;
>> wherein the generating of the second schema definition includes, based on the first workload description and the first schema definition, selecting a subset of database objects to translate to a particular form that is described by said second schema definition and that is compatible with the second database system, wherein the subset of database objects belong to said first plurality of database objects.

18. The non-transitory computer-readable medium of claim 17, wherein the second database system stores the one or more second database objects, and wherein the selecting of the subset of database objects is based on at least one of:
> a size of the one or more second database objects fitting within a storage constraint;
> a size of the one or more second database objects fitting within an available memory size of the second database system as an in-memory database;
> a type of the second database system;
> a version of the second database system;
> a configuration of the second database system;
> maximizing a reduction in execution time when the second database system services database queries on the subset of database objects by translating the database queries to the second schema definition.

19. A database advisor system comprising one or more computing devices configured to:
> store a first schema definition describing a first plurality of database objects;
> store a first workload description describing access to the first plurality of database objects at a first database system, wherein the first workload description comprises information about execution of queries against at least a portion of the first plurality of database objects;
> generate a second schema definition describing a second plurality of database objects,
>> wherein each database object of the second plurality of database objects is a counter-part to one or more database objects of the first plurality of database objects and is compatible with a second database system;
>> wherein the generating of the second schema definition includes, based on the first workload description and the first schema definition, selecting a subset of database objects to translate to a particular form that is described by said second schema definition and that is compatible with the second database system, wherein the subset of database objects belong to said first plurality of database objects.

20. The database advisor system of claim 19, wherein the second database system stores the one or more second database objects, and wherein the selecting of the subset of database objects is based on at least one of:
> a size of the one or more second database objects fitting within a storage constraint;
> a size of the one or more second database objects fitting within an available memory size of the second database system as an in-memory database;
> a type of the second database system;
> a version of the second database system;
> a configuration of the second database system;
> maximizing a reduction in execution time when the second database system services database queries on the subset of database objects by translating the database queries to the second schema definition.

21. The method of claim 10, wherein the at least one of the first actual execution or the second actual execution utilizes a virtual cache to load and unload the particular database objects into a memory.

22. The method of claim 21, wherein the particular database objects are unloaded from the memory when no longer necessary for the at least one of the first actual execution or the second actual execution.

23. The method of claim 21, wherein a size of the virtual cache does not exceed a largest parent database object set selected from the parent database object set of each of the plurality of hierarchies.

24. The method of claim 1, wherein the second schema definition utilizes a columnar-store data format.

25. The non-transitory computer-readable medium of claim 18, wherein the reduction in execution time is estimated based on statistics of the first database system.

26. A non-transitory computer-readable medium storing one or more sequences of instructions which, when executed by one or more processors, cause:
> storing a first schema definition describing a first plurality of database objects;
> storing a first workload description describing access to the first plurality of database objects at a first database system;
> generating a second schema definition describing a second plurality of database objects, wherein each database object of the second plurality of database objects is a counter-part to one or more database objects of the first plurality of database objects;
> wherein the generating of the second schema definition includes, based on the first workload description and the first schema definition, selecting particular database objects in the first plurality of database objects, wherein one or more second database objects in the second plurality of database objects are counter-parts to the particular database objects;
> wherein the first workload description comprises a plurality of queries, and wherein the selecting of the particular database objects comprises:
>> arranging the plurality of queries into a plurality of hierarchies, wherein:
>>> each hierarchy includes a query set having a root query on a parent database object set, wherein all queries in the query set are on database objects within the parent database object set;
>>> each hierarchy is associated with a value reflecting an execution time reduction when comparing an execution time of the query set on the first database system to an execution time of a corresponding query set on a second database system, wherein the corresponding query set is on a corresponding set of database objects in the second plurality of database objects that are counter-parts to the parent database object set;

determining an optimized hierarchy set from the plurality of hierarchies based on maximizing a total value of the optimized hierarchy set when the particular database objects are selected to include the parent database object set from each of the root queries of the optimized hierarchy set.

27. The non-transitory computer-readable medium of claim 26, wherein the one or more sequences of instructions include instructions that, when executed by one or more processors, cause for each hierarchy of the plurality of hierarchies, the execution time of the query set and the execution time of the corresponding query set to be measured by a first actual execution of the query set on the first database system and a second actual execution of the corresponding query set on the second database system.

28. The non-transitory computer-readable medium of claim 27, wherein the first actual execution uses a test database system of the first database system.

29. The non-transitory computer-readable medium of claim 27, wherein the one or more sequences of instructions include instructions that, when executed by one or more processors, cause at least one of the first actual execution or the second actual execution to be grouped according to the plurality of hierarchies to execute in-memory.

30. The non-transitory computer-readable medium of claim 29, wherein the at least one of the first actual execution or the second actual execution is further grouped by hierarchies on shared database objects, wherein the one or more sequences of instructions include instructions that, when executed by one or more processors, cause at least a portion of the shared database objects to be retained in-memory between the at least one of the first actual execution or the second actual execution of the hierarchies on the shared database objects.

31. The non-transitory computer-readable medium of claim 26, wherein the determining of the optimized hierarchy set utilizes one or more of a multi-path greedy selection algorithm and a dynamic programming algorithm.

32. The non-transitory computer-readable medium of claim 29, wherein the one or more sequences of instructions include instructions that, when executed by one or more processors, cause an algorithm for the determining of the optimized hierarchy set to be chosen based on a size of the first workload description.

33. The non-transitory computer-readable medium of claim 17, wherein the one or more sequences of instructions which, when executed by one or more processors, wherein the one or more sequences of instructions include instructions that, when executed by one or more processors, cause:

determining one or more database technologies of the second database system for storing the one or more second database objects.

34. The non-transitory computer-readable medium of claim 17, wherein the one or more sequences of instructions which, when executed by one or more processors, wherein the one or more sequences of instructions include instructions that, when executed by one or more processors, cause:

outputting a report describing the subset of database objects, a mapping from the first schema definition to the second schema definition, a list of potential compatibility issues, and a projected performance benefit when servicing the one or more second database objects on the second database system.

35. The non-transitory computer-readable medium of claim 17, wherein the one or more sequences of instructions which, when executed by one or more processors, wherein the one or more sequences of instructions include instructions that, when executed by one or more processors, cause:

generating one or more scripts to configure the second database system as a caching system for the first database system, wherein a database query on the subset of database objects of the first database system is serviced by the second database system translating the database query to the second schema definition.

36. The non-transitory computer-readable medium of claim 27, wherein the at least one of the first actual execution or the second actual execution utilizes a virtual cache to load and unload the particular database objects into a memory.

37. The non-transitory computer-readable medium of claim 36, wherein the particular database objects are unloaded from the memory when no longer necessary for the at least one of the first actual execution or the second actual execution.

38. The non-transitory computer-readable medium of claim 36, wherein a size of the virtual cache does not exceed a largest parent database object set selected from the parent database object set of each of the plurality of hierarchies.

39. The non-transitory computer-readable medium of claim 17, wherein the second schema definition utilizes a columnar-store data format.

\* \* \* \* \*